United States Patent
Curlier et al.

(10) Patent No.: US 9,708,926 B2
(45) Date of Patent: Jul. 18, 2017

(54) TURBINE ENGINE COMPRISING A MEANS FOR MEASURING THE SPEED AND TORQUE OF A SHAFT OF THE TURBINE ENGINE AND METHOD FOR MONITORING SAID SHAFT

(71) Applicant: SNECMA, Paris (FR)

(72) Inventors: Augustin Curlier, Moissy Cramayel (FR); Olivier Belmonte, Moissy Cramayel (FR); Gilles Le Gouellec, Moissy Cramayel (FR)

(73) Assignee: SNECMA, Paris (FR)

(*) Notice: Subject to any disclaimer, the term of this patent is extended or adjusted under 35 U.S.C. 154(b) by 314 days.

(21) Appl. No.: 14/426,147

(22) PCT Filed: Sep. 5, 2013

(86) PCT No.: PCT/FR2013/052051
§ 371 (c)(1),
(2) Date: Mar. 4, 2015

(87) PCT Pub. No.: WO2014/037673
PCT Pub. Date: Mar. 13, 2014

(65) Prior Publication Data
US 2015/0211380 A1    Jul. 30, 2015

(30) Foreign Application Priority Data
Sep. 6, 2012 (FR) .................................. 12 58317

(51) Int. Cl.
*F01D 21/00*    (2006.01)
*F01D 1/18*    (2006.01)
(Continued)

(52) U.S. Cl.
CPC ............. *F01D 21/003* (2013.01); *F01D 1/18* (2013.01); *F01D 25/24* (2013.01); *F02K 3/025* (2013.01);
(Continued)

(58) Field of Classification Search
CPC ........ F01D 21/003; F01D 21/02; F01D 25/24; G01H 1/006; G01L 3/105; G01L 5/26;
(Continued)

(56) References Cited

U.S. PATENT DOCUMENTS 2,457,700 A * 12/1948 Martin .................... G01L 3/105
336/135
2,826,064 A * 3/1958 Hastings ................. G01L 3/105
73/862.332
(Continued)

FOREIGN PATENT DOCUMENTS

FR    2 373 044    6/1978
FR    2 595 821    9/1987
(Continued)

Primary Examiner — Dwayne J White
Assistant Examiner — Peter T Hrubiec
(74) Attorney, Agent, or Firm — Blakely Sokoloff Taylor & Zafman LLP (57) ABSTRACT

Turbine engine (1), in particular for an aircraft, comprising at least one axial shaft (2) rotatably mounted in a casing (3) of the turbine engine (1), the turbine engine (1) comprising an annular reference part (10) comprising short (11) and long (12) longitudinal reference teeth, first means for detecting the passage of the short (11) and long (12) reference teeth so as to measure the speed of the shaft (2) of the turbine engine (1) about its axis (X), an annular measurement part (20) comprising longitudinal measurement teeth (21); and second means for detecting the passage of the long reference teeth (12) and the measurement teeth (21) so as to measure the torque of the shaft (2, 102) of the turbine engine (1).

18 Claims, 7 Drawing Sheets

(51) Int. Cl.
*F01D 25/24* (2006.01)
*F02K 3/02* (2006.01)
*G01L 3/10* (2006.01)
*G01M 15/14* (2006.01)
*G01P 3/488* (2006.01)

(52) U.S. Cl.
CPC ............ *G01L 3/105* (2013.01); *G01M 15/14* (2013.01); *G01P 3/488* (2013.01); *F05D 2260/80* (2013.01); *F05D 2270/304* (2013.01); *F05D 2270/335* (2013.01); *F05D 2270/809* (2013.01); *Y02T 50/671* (2013.01)

(58) Field of Classification Search
CPC ...... G01M 15/14; G01P 3/488; F04D 27/001; F05D 2260/80; F05D 2270/304; F05D 2270/335; F05D 2270/809
USPC ........ 415/118; 73/514.31, 862.328, 862.331, 73/862.326, 862.626, 779
See application file for complete search history.

(56) References Cited

U.S. PATENT DOCUMENTS

| | | | |
|---|---|---|---|
| 4,682,505 A | 7/1987 | Morissette et al. | |
| 7,246,531 B2* | 7/2007 | Nakane | G01L 3/104 73/862 |
| 7,644,635 B2* | 1/2010 | Prudham | G01L 3/104 73/862.331 |
| 7,784,365 B2* | 8/2010 | Masson | G01L 3/104 73/862.331 |
| 2004/0050178 A1 | 3/2004 | Parkinson | |

FOREIGN PATENT DOCUMENTS

| | | |
|---|---|---|
| GB | 604182 | 6/1948 |
| GB | 617064 | 2/1949 |

* cited by examiner

Fig. 14

TURBINE ENGINE COMPRISING A MEANS FOR MEASURING THE SPEED AND TORQUE OF A SHAFT OF THE TURBINE ENGINE AND METHOD FOR MONITORING SAID SHAFT

GENERAL TECHNICAL FIELD AND PRIOR ART

The present invention relates to the field of turbine engines, in particular the measurement of the speed and the measurement of the torque of a shaft of the turbine engine.

Figure 1:
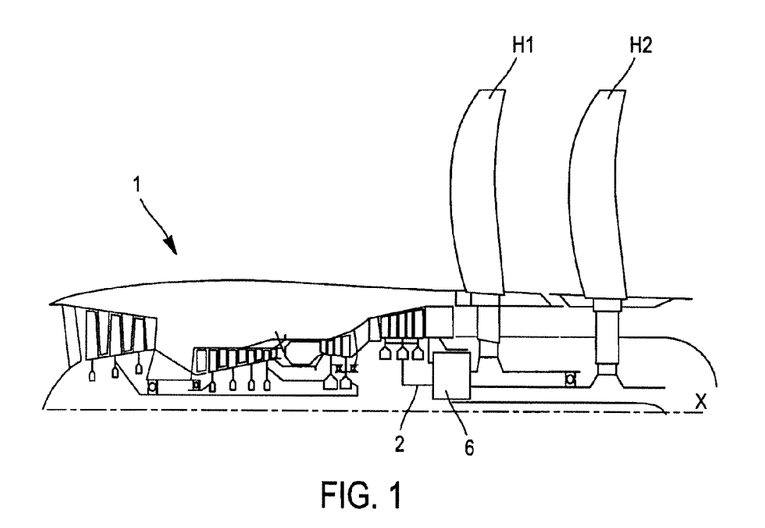
FIG. 1 is a schematic representation in axial cross-section of a conventional turbine engine with two propellers (already described)

As an example, with reference to FIG. 1, an "open-rotor" type turbine engine 1 has two propellers H1, H2, driven by a turbine shaft 2 via an epicyclic train 6. Usually, the turbine engine 1 has means for measuring the speed of the turbine shaft in order to monitor, in particular, for overspeed of the turbine shaft 2. The turbine engine also has means for measuring the torque in order to avoid any activation of the means for protection against overtorque, for example, fusible sections such as those known from the patent application FR2910948 by the company Hispano Suiza.

The speed measurement means and the torque measurement means are conventionally separate in a turbine engine and their weight and dimensions are significant, which adversely affects the efficiency of the turbine engine. Consideration has to be given to the weight and the dimensions of the measuring means, the equipment necessary for their proper operation and the constraints on mounting and integration into a crowded environment. These measuring means are used, for example, in protection against overtorque, limiters in regulation, cockpit displays, instrumentation in particular for monitoring, etc.

One of the objects of this application is to propose a turbine engine comprising means for measuring the speed and torque of a shaft of a turbine engine, the weight and dimensions of which are restricted while maintaining an accuracy of measurement that is equivalent to the prior art.

GENERAL DESCRIPTION OF THE INVENTION

To that end, the invention relates to a turbine engine, in particular for an aircraft, comprising at least one axial shaft rotatably mounted in a casing of the turbine engine, the turbine engine comprising:
  an annular reference part which is rigidly connected to a first portion of the shaft of the turbine engine, said reference part comprising short and long longitudinal reference teeth;
  first means for detecting the passage of the short and long reference teeth in a first transverse plane so as to measure the speed of the shaft of the turbine engine about its axis;
  an annular measurement part which is rigidly connected to a second portion of the shaft of the turbine engine which is remote from said first portion, the measurement part comprising longitudinal measurement teeth; and
  second means for detecting the passage of the long reference teeth and the measurement teeth in a second transverse plane so as to measure the torque of the shaft of the turbine engine.

In the present application, "teeth of an annular part" means elements that extend in a longitudinal direction and are spaced from one another in a circumferential direction.

The teeth can be separated from one another by notches formed at an end of the annular part. In this case, the teeth have free axial (distal) ends, these teeth being connected to an annular portion of the part by their opposed (proximal) axial ends. In a variant, the teeth can be separated from one another by slots formed in the annular part. In this case, the teeth do not have free axial ends, as their proximal ends are connected to an annular portion of the part and their distal ends are connected to another annular portion of the part.

Advantageously, the long reference teeth enable, firstly, the speed to be measured in a first transverse plane and, secondly, the torque to be measured in a second transverse plane. The reference part and the measurement part of the turbine engine thus allow two parameters of the shaft to be measured simultaneously. The number of parts used for the measurements is therefore smaller in comparison with the prior art, which reduces the weight and the dimensions of the turbine engine. In addition, mounting and maintenance are easier to carry out in comparison with the prior art.

Preferably, the short reference teeth and the measurement teeth are at different radial distances from the axis of the turbine engine. Preferably again, each long reference tooth has a proximal portion and a distal portion that are at different radial distances from the axis of the turbine engine. Preferably once again, the distal portion of the long reference teeth is at the same radial distance from the axis of the turbine engine as the measurement teeth. Preferably, the proximal portion of each long reference tooth extends at the same radial distance as the short reference teeth.

Thus, the first detection means and the second detection means can extend at different radial distances from the axis of the turbine engine so as to restrict their dimensions. Preferably, the first detection means and the second detection means are staggered.

According to a preferred aspect of the invention, the proximal portion of a long reference tooth is radially external to its distal portion so as to restrict the centrifugal forces applied to the distal portion. This is because the longer the teeth, the more the teeth tend to move away radially outwards during rotation of the shaft. When the radius of installation of the distal portion of the long teeth is reduced, this makes it possible to reduce the centrifugal forces applied to the teeth and thus the deflection thereof.

In a particular embodiment of the invention, the short reference teeth and the proximal portions of the long reference teeth are formed by a perforated annular portion of the annular reference part.

Forming the teeth by perforating an annular part makes it possible:
  to stiffen the assembly under centrifugal force (very interesting), and
  to make the two annular parts or phonic wheels (reference and measurement) relatively similar, which enables the induction of Eddy currents in the teeth to be made symmetrical between one wheel and the other and the measurement to be made more accurate (similar disturbances for the teeth on the reference phonic wheel and the teeth on the torque measurement phonic wheel).

The distal portions of the long reference teeth can extend longitudinally from said perforated annular portion. The distal portion of each long reference tooth can be axially aligned with the proximal portion of said tooth. In a variant, the distal portion of each long reference tooth is angularly offset from the proximal portion of said tooth.

Preferably, the turbine engine has the same number of long reference teeth and measurement teeth, which enables the change in their angular spacing in the second transverse plane to be measured.

Preferably, the axial distance between the first transverse plane and the second transverse plane results from a compromise between a maximum level of compactness of the turbine engine and protection against interferences between sensors in two separate planes. Preferably, the axial distance is dependent on the nature of the sensors used as detection means.

Preferably, the first detection means and the second detection means are at different radial distances from the axis of the turbine engine so as to restrict their dimensions. Preferably again, the radial distance of the detection means is dependent on the radial distance of the teeth monitored by said detection means so as to maintain a minimum gap distance.

Preferably again, the first detection means and the second detection means take the form of inductive speed sensors and inductive torque sensors respectively, the speed sensors and the torque sensors being identical. Such inductive sensors are particularly suitable for detecting the passage of teeth made of ferromagnetic material.

According to an aspect of the invention, the speed sensors and the torque sensors are rigidly connected to the casing of the turbine engine, preferably via a support part. Preferably, the speed sensors and the torque sensors are disposed alternately, being staggered for example, at the circumference of said support part, which enables their dimensions to be restricted.

The invention also relates to a method for monitoring an axial shaft of a turbine engine mounted which is mounted rotatably in a casing of the turbine engine, the turbine engine comprising an annular reference part which is rigidly connected to a first portion of the shaft of the turbine engine, the reference part comprising short and long longitudinal reference teeth, an annular measurement part which is rigidly connected to a second portion of the shaft of the turbine engine which is remote from said first portion, the measurement part comprising longitudinal measurement teeth, the method comprising:
 a step of detecting the passage of the short and long reference teeth in a first transverse plane so as to measure the speed of the shaft of the turbine engine about its axis; and
 a step of detecting the passage of the long reference teeth and the measurement teeth in a second transverse plane so as to measure the torque of the shaft of the turbine engine.

PRESENTATION OF THE DRAWINGS

The invention will be better understood upon reading the description that follows, given solely by way of example, and with reference to the accompanying drawings, in which.

It should be noted that the drawings explain the invention in detail in order for the invention to be implemented, it of course being possible for said drawings to be used to better define the invention where necessary.

DESCRIPTION OF ONE OR MORE EMBODIMENTS

The invention will be described for an "open-rotor" type turbine engine that has two unducted propellers connected to an epicyclic train of the turbine engine. The turbine engine has an axial turbine shaft that provides a torque to the epicyclic train which is distributed to both propellers. Consequently, the words "upstream" and "downstream" are defined in relation to the direction of flow of the gases in the turbine engine, which circulate from upstream to downstream.

According to the invention, the speed of rotation and the torque of the turbine shaft are measured so as to monitor for any occurrence of overspeed or overtorque. It is self-evident that the invention applies to any shaft of a turbine engine, in particular a turbojet engine shaft.

Figure 2:
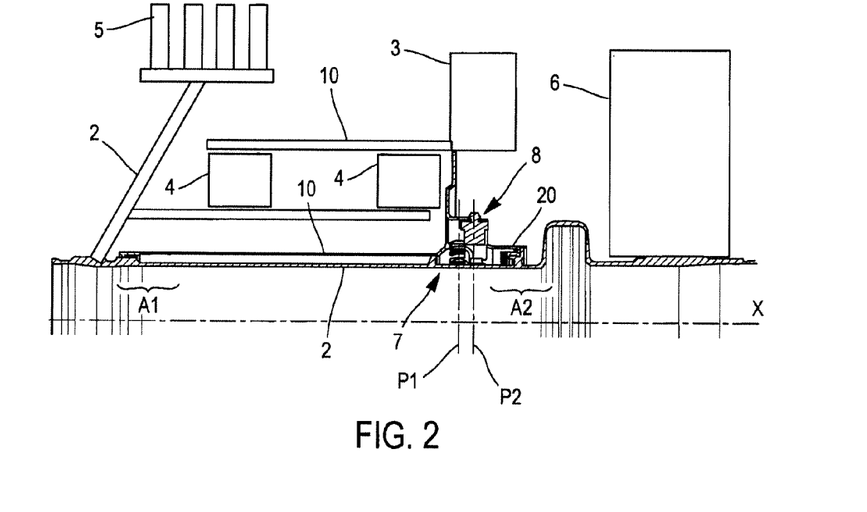
FIG. 2 is a schematic representation in axial cross-section of a turbine engine according to the invention with a reference part and a measurement part.

With reference to FIG. 2, the turbine engine 1 has a turbine shaft 2 which is mounted rotatably in an annular casing 3 of the turbine engine 1 via two guide bearings 4. In this example, rotor blades 5 are rigidly connected to the turbine shaft 2 in order to drive the propellers (not shown) via an epicyclic train 6 of the turbine engine. In this example, in a manner known to the person skilled in the art, the rotor blades 5 are connected to the turbine shaft 2 by a journal (not provided with a reference numeral).

According to the invention, still with reference to FIG. 2, the turbine engine 1 has an annular reference part 10 which is rigidly connected to a first portion A1 of the shaft 2 of the turbine engine 1 and an annular measurement part 20 which is rigidly connected to a second portion A2 of the shaft 2 of the turbine engine 1 that is remote from said first portion A1. In this example, the reference part 10 is fixed to a first upstream portion A1 of the shaft 2 while the measurement part 20 is fixed to a second downstream portion A2 of the shaft 2.

Figure 3:
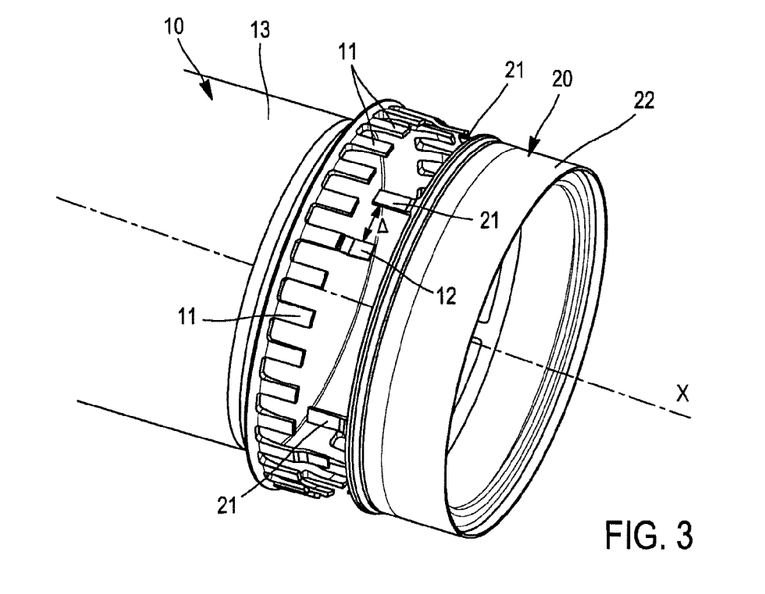
FIG. 3 is a schematic perspective representation of the reference part and the measurement part which are both rigidly connected to a shaft of the turbine engine.

As shown in FIG. 3, the reference part 10 and the measurement part 20 are aligned longitudinally along the axis X of the turbine engine 1. The reference part 10 has short 11 and long 12 longitudinal reference teeth while the measurement part 20 has longitudinal measurement teeth 21.

With reference to FIG. 2, the turbine engine also has first means 7 for detecting the passage of the reference teeth 11, 12 in a first transverse plane P1 so as to measure the speed of the shaft 2 of the turbine engine 1 about its axis X and second means 8 for detecting the passage of the long reference teeth 12 and the measurement teeth 21 in a second transverse plane P2 in order to determine the angular spacing between a long reference tooth 12 and a measurement tooth 21 so as to measure the torque of the shaft 2 of the turbine engine 1.

Reference Part 10

Figure 4:
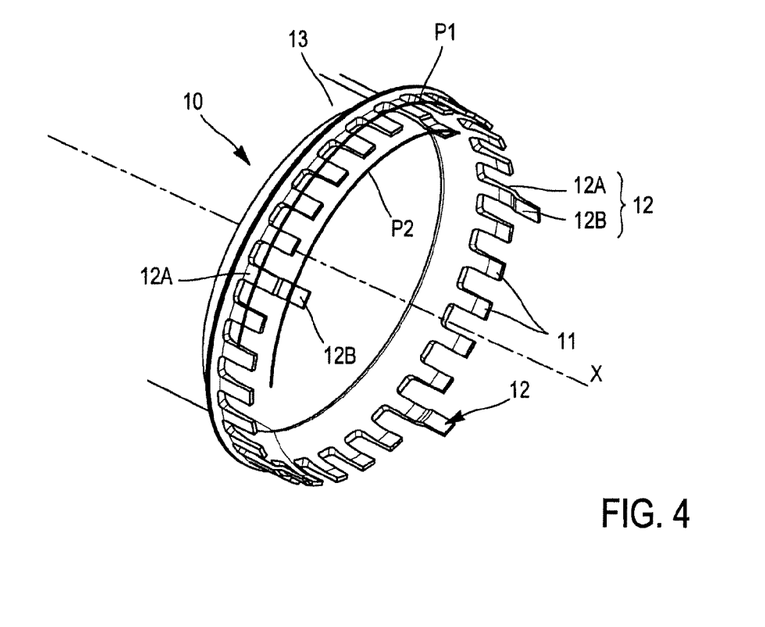
FIG. 4 is a schematic perspective representation of the reference part.

With reference to FIG. 4, the reference part 10 is an annular part that extends longitudinally along the axis X of the turbine engine. As stated above, the reference part 10 has short 11 and long 12 longitudinal reference teeth. The longitudinal teeth 11, 12 extend longitudinally relative to the axis X of the turbine engine from the cylindrical body 13 of the reference part 10. In this embodiment, the reference teeth 11, 12 extend from upstream to downstream, but it is self-evident that they could also extend from downstream to upstream, as will be shown below.

The reference teeth 11, 12 are ferromagnetic teeth adapted to cause inductive sensors to react, as will be shown below.

With reference to FIG. 4, the reference teeth 11, 12 (short or long) are distributed at the circumference of the cylindrical body 13 of the reference part 10. They are separated from one another by radial notches present at the downstream end of the reference part 10. The short reference teeth 11 have free downstream or distal ends, their upstream or proximal ends being connected to the cylindrical body 13 of the part. In this example, the reference part 10 has thirty teeth of which five are long 12 and twenty-five are short 11. Preferably, the long reference teeth 12 are distributed at the circumference of the cylindrical body 13 of the reference part 10.

With reference to FIG. 4, the short reference teeth 11 all extend at the same radial distance from the axis X of the turbine engine. The long reference teeth 12 have a proximal portion 12A terminated by a distal portion 12B. In other words, each long reference tooth 12 is terminated at its end by a distal portion 12B.

The proximal portion 12A of each long reference tooth 12 extends at the same radial distance from the axis X of the turbine engine as the short reference teeth 11. In addition, the short reference teeth 11 and the proximal portion 12A of the long reference teeth 12 extend in a single plane P1 transverse to the axis X of the turbine engine. This first transverse plane P1 forms the speed measurement plane as will be explained below.

In other words, the short reference teeth 11 and the proximal portion 12A of the long reference teeth 12 form a set of teeth, called speed teeth, distributed at the circumference of the reference part 10, in a single transverse plane P1 and at the same radial distance from the axis X of the turbine engine. Preferably, the dimensions of the short reference teeth 11 and of the proximal portion 12A of the long reference teeth 12 are the same.

The distal portion 12B of each long reference tooth 12 is offset radially relative to its proximal portion 12A. In other words, the distal portion 12B and the proximal portion 12A extend at different radial distances from the axis X of the turbine engine. As shown in FIG. 4, the distal portion 12B of each long reference tooth 12 extends at a radial distance from the axis X of the turbine engine that is less than the radial distance for the short reference teeth 11. In other words, the distal portion 12B of each long reference tooth 12 is closer to the axis of the turbine engine than its proximal portion 12A so as to reduce its length-related centrifugal deformation by stiffening the long reference tooth 12.

The distal portion 12B of the long reference teeth 12 extends in a single plane P2 transverse to the axis X of the turbine engine. This second transverse plane P2 forms the torque measurement plane as will be explained below.

Figure 5:
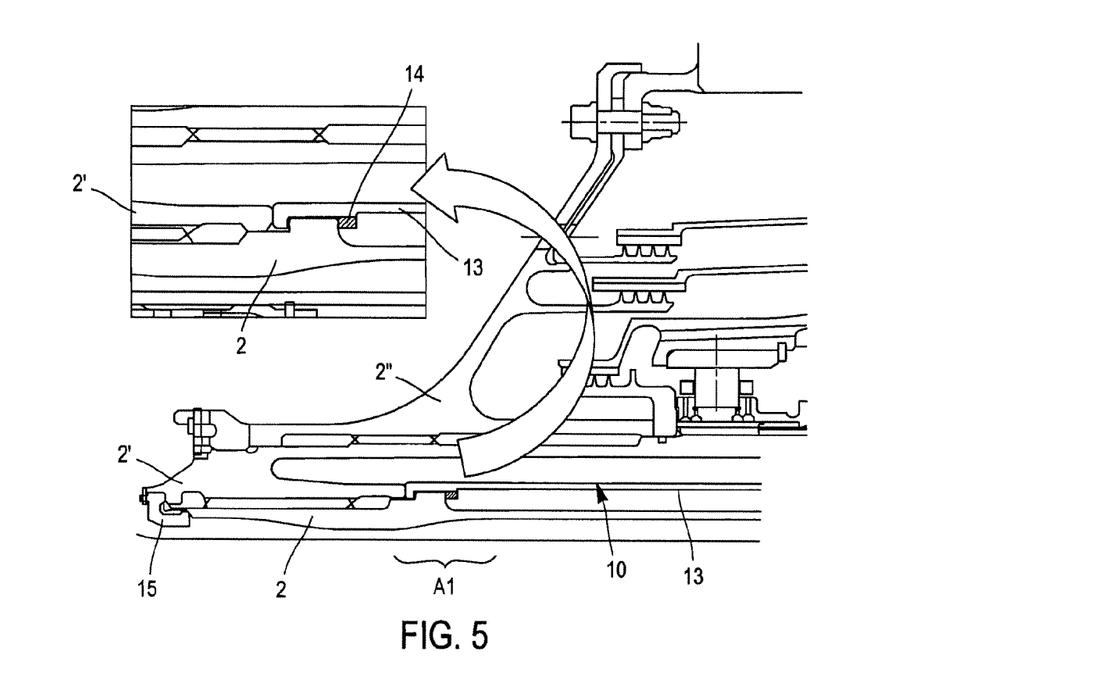
FIG. 5 is a representation in axial cross-section of the upstream fixing of the reference part to the shaft of the turbine engine.

As shown in FIGS. 2 and 5, the reference part 10 is mounted so that it is rigidly connected to and external to the turbine shaft 2. In the example shown in FIG. 5, the upstream end of the reference part 10 has splines 14 adapted to cooperate with splines of the turbine shaft 2 in order to provide, firstly, an axial connection and, secondly, a rotational connection at the first upstream portion A1 of the turbine shaft 2. It is self-evident that other connection means could also be suitable. Preferably, the reference part 10 has locating means to facilitate the mounting thereof.

During mounting, the reference part 10 is inserted from upstream to downstream to be fixed to the turbine shaft 2 before being locked in place by a locking nut. In this example, with reference to FIG. 5, the turbine engine has an intermediate shaft 2' mounted between the turbine shaft 2 and a journal 2", the intermediate shaft 2', the turbine shaft 2 and the journal 2" being connected in rotation.

The connection between the turbine shaft 2 and the intermediate shaft 2' is produced by a splined connection so that a centring element of the portion of the splined connection situated on the intermediate shaft 2' bears against the reference part 10 when being assembled, the axial locking being produced when the nut 15 situated on the left end in FIG. 5 is tightened.

As shown in FIG. 2, the reference part 10 extends longitudinally around the turbine shaft 2 so that the reference teeth 11, 12 extend at a distance from the first upstream portion A1 of the turbine shaft 2 to which the reference part 10 is fixed. Consequently, the reference teeth 11, 12 of the reference part 10 make it possible to represent the torque received by the turbine shaft at the first upstream portion A1 of the turbine shaft 2.

Measurement Part 20

Figure 6:
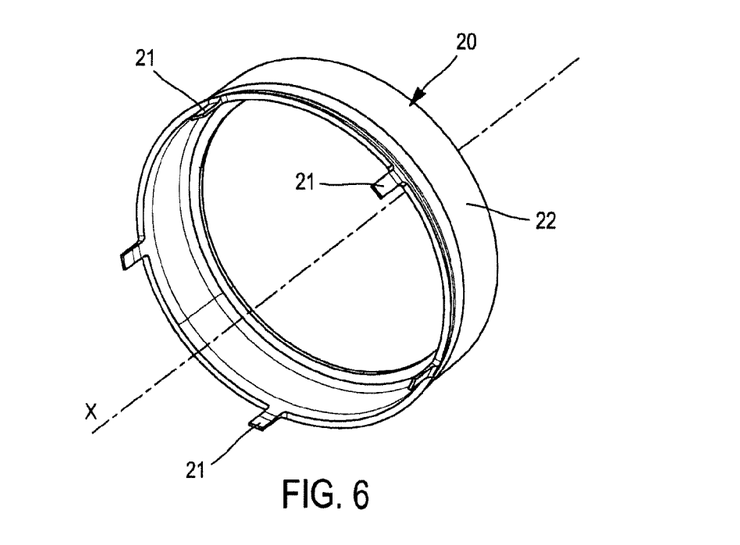
FIG. 6 is a schematic perspective representation of the measurement part.

With reference to FIG. 6, the measurement part 20 is an annular part that extends longitudinally along the axis X of the turbine engine. As already stated, the measurement part 20 has longitudinal measurement teeth 21. The measurement teeth 21 extend longitudinally relative to the axis X of the turbine engine from the cylindrical body 22 of the measurement part 20. In this embodiment, the measurement teeth 21 extend from downstream to upstream, but it is self-evident that they could also extend from upstream to downstream. The upstream ends of the teeth 21 are free.

The measurement teeth 21 are ferromagnetic teeth adapted to cause inductive sensors to react, as will be shown below.

With reference to FIG. 6, the measurement teeth 21 are distributed at the circumference of the cylindrical body 22 of the measurement part 20. In this example, the measurement part 20 has five measurement teeth 21. Preferably, the measurement part 20 has as many measurement teeth 21 as long reference teeth 12.

The measurement teeth 21 all extend at the same radial distance $R_b$ from the axis X of the turbine engine, in other words, at the same radial distance as the distal portion 12B of the long reference teeth 12. In addition, the measurement teeth 21 extend in a single plane P2 transverse to the axis X of the turbine engine, as will be explained below.

Figure 7:
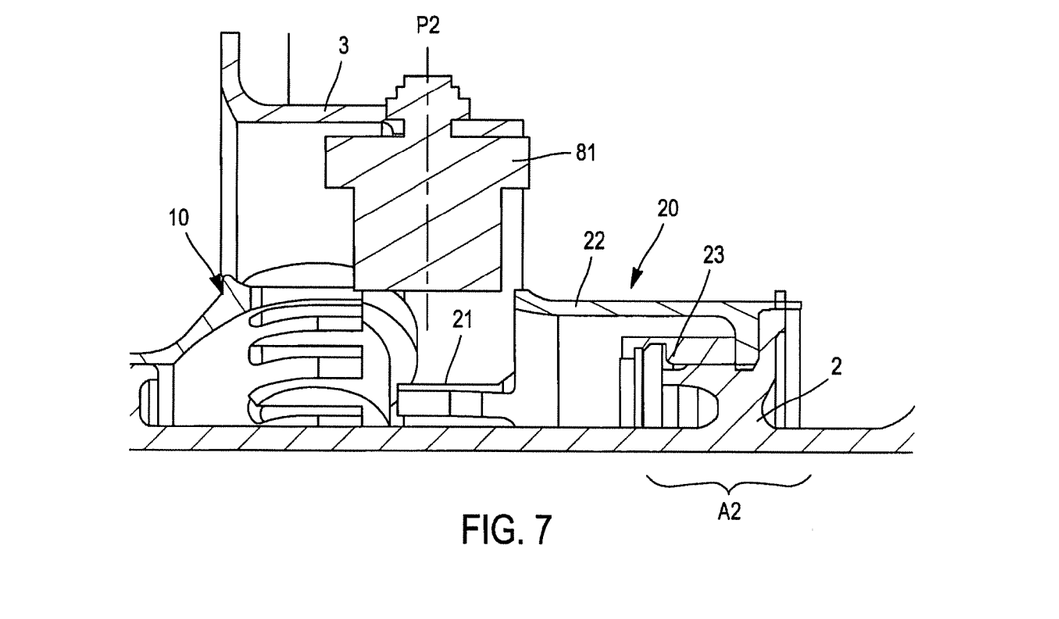
FIG. 7 is a representation in axial cross-section of the fixing of the measurement part to the shaft of the turbine engine.

As shown in FIGS. 2 and 7, the measurement part 20 is mounted so that it is rigidly connected to and external to the turbine shaft 2. In the example shown in FIG. 7, the downstream end of the measurement part 20 is mounted by interlocking on the second downstream portion A2 of the turbine shaft 2 in order to provide, firstly, an axial connection and secondly, a rotational connection at the second downstream portion A2 of the turbine shaft 2. It is self-evident that other connection means could also be suitable.

During mounting, the measurement part 20 is inserted from upstream to downstream to be fixed to the turbine shaft 2 before being locked by a locking nut 23. As shown in FIG. 7, the measurement part 20 extends longitudinally around the turbine shaft 2 so that the measurement teeth 21 extend from downstream to upstream. The longitudinal length of the measurement part 20 is short relative to that of the reference part 10. Consequently, the measurement teeth 21 of the measurement part 20 make it possible to represent the torque received by the turbine shaft at the second downstream portion A2 of the turbine shaft 2.

Detection Means 7 and 8

According to the invention, the turbine engine 1 has first means 7 for detecting the passage of the reference teeth 11, 12 in the first transverse plane P1 and second means 8 for detecting the passage of the long reference teeth 12 and of the measurement teeth 21 in the second transverse plane P2.

The detection means 7, 8 are rigidly connected to the casing 3 of the turbine engine as shown in FIG. 2. Preferably, the detection means 7, 8 take the form of inductive sensors 71, 81 respectively, extending in two separate transverse planes P1, P2. It is self-evident that the detection means could be different, in particular, optical or capacitive sensors could also be suitable.

Figure 8:
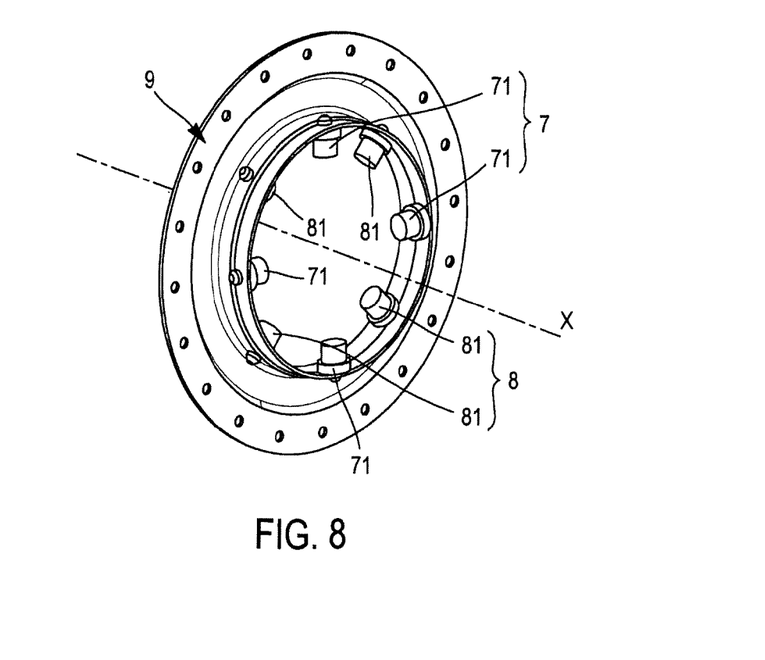
FIG. 8 is a perspective representation of the inductive sensors mounted on a support.

In this example, with reference to FIG. 8, the inductive sensors of the first and second detection means 7, 8 are mounted so as to be rigidly connected to an annular support 9 which is mounted so as to be rigidly connected to the casing 3. Still with reference to FIG. 8, the inductive sensors 71, 81 are oriented radially towards the axis X of the turbine engine 1 so as to detect the passage of the teeth 11, 12, 21.

The inductive sensors 71 of the first detection means 7, henceforth referred to as speed sensors 71, are distributed at the circumference of the casing 3 in the first plane P1 and at a single radial distance from the axis X of the turbine engine. Similarly, the inductive sensors 81 of the second detection means 8, henceforth referred to as torque sensors 81, are distributed at the circumference of the casing 3 in the second plane P2 and at a single radial distance from the axis X of the turbine engine. Preferably, the speed sensors 71 and the torque sensors 81 are alternate, in other words they are staggered, so as to reduce the risk of interference between sensors 71, 81 that do not belong to the same plane P1, P2, and to restrict the dimensions.

In addition, the speed sensors 71 are more remote from the axis X of the turbine engine in comparison with the torque sensors 81 so as to compensate for the radial gap between the distal portion 12B and the proximal portion 12A of the long measurement teeth 12. Each inductive sensor 71, 81 is thus at the same radial distance from the teeth 11, 12, 21 whose passage it must monitor, which is advantageous. Preferably, the inductive sensors 71, 81 are all identical and known to the person skilled in the art.

The detection means 7, 8 are connected to a calculator (not shown) of the turbine engine 1 that is adapted to calculate the speed of the shaft 2 and the torque in accordance with the information provided by the detection means 7, 8.

Example of Implementation

Figure 9:
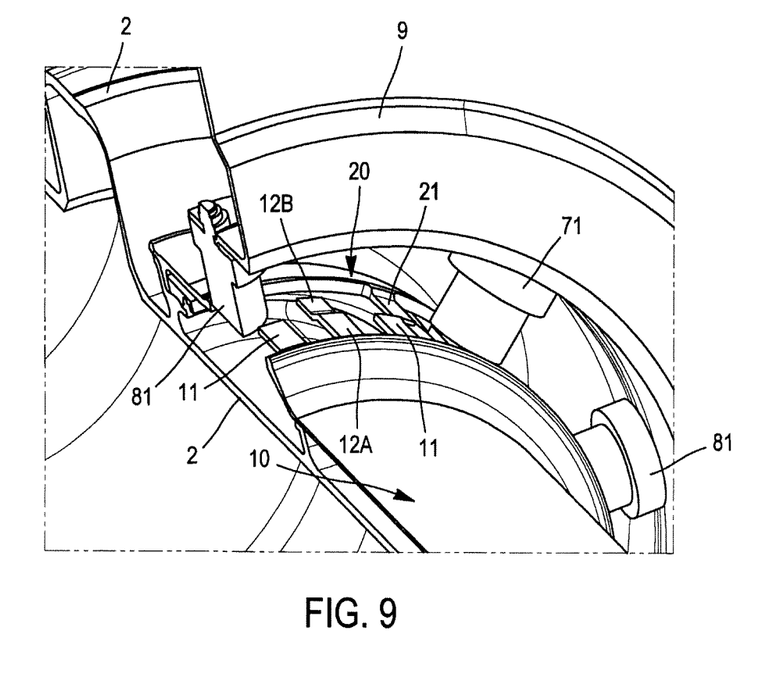
FIG. 9 is a partial perspective representation of the turbine engine during measurement of the speed and measurement of the torque by the inductive sensors during the passage of the reference teeth and of the measurement teeth.

An example of implementation of the invention is shown in FIGS. 2 and 9 in which the reference part 10 and the measurement part 20 are joined to the turbine shaft 2 so that the distal portion 12B of the long reference teeth 12 extends in the same transverse plane as the measurement teeth 21.

With reference to FIG. 9, in the first plane P1, the speed sensors 71 of the first detection means 7 monitor the passage of the speed teeth of the reference part 10, in other words, the short reference teeth 11 and the proximal portion 12A of the long reference teeth 12. Because of their ferromagnetic nature, the speed teeth 11, 12A cause the speed sensors 71 to react through induction as they rotate. Thus, a given speed sensor 71 measures the average time of passage between two successive reference teeth. Thus, the speed sensors 71 can deduce therefrom the speed of angular rotation of the reference part 10 and, consequently, the speed of rotation of the turbine shaft 2 onto which the reference part 10 is mounted so as to be rigidly connected thereto. As the short reference teeth 11 and the proximal portion 12A of the long reference teeth 12 are at the same radial distance, the speed sensors 71 measure the speed of rotation uniformly. Preferably, the data from the different speed sensors 71 is averaged in order to obtain the speed of the shaft 1.

Measurement of the speed of rotation of the shaft 2 is preferably performed using the portion that is furthest upstream so that the speed can be measured in the event of the shaft breaking, as the portion furthest downstream is no longer driven.

Still with reference to FIG. 9, in the second plane P2, the torque sensors 81 of the second detection means 8 monitor the passage of the measurement teeth 21 and of the distal portion 12B of the long reference teeth 12. Because of their ferromagnetic nature, said teeth 21, 12B cause the torque sensors 81 to react through induction as they rotate. Thus, a given torque sensor 81 measures the average time of passage between a long reference tooth 12 and a measurement tooth 21. Preferably, the angle of torque is measured by torque sensors 81 that are diametrically opposed in the casing 3.

Thus, the torque sensors 81 can deduce therefrom the change in the angular spacing between a measurement tooth 21 and the distal portion 12B of a long reference tooth 12 relative to a predetermined angular spacing. This is because when the turbine shaft 2 is stationary, the angular spacing between a measurement tooth 21 and the distal portion 12B of a long reference tooth 12 is perfectly defined given that both teeth 21, 12B are rigidly connected to the turbine shaft 2, which is immobile.

During rotation of the turbine shaft 2, said shaft is subject to a torque about its axis X. This torque is manifested by a change in the angular spacing defined when stationary. This angular spacing is known to the person skilled in the art as the angle of torque. Since the reference part 10 and the measurement part 20 are respectively connected to upstream A1 and downstream A2 portions of the shaft 2 that are remote from one another, any alteration of the angular spacing relative to a torque between the installation positions A1, A2 of the reference part 10 and of the measurement part 20 on the turbine shaft 2 is made evident, the angular spacing being dependent on the distance between the fixing portions A1, A2. Usually, the torque is determined from calibration tables that associate an angle of torque with a torque for a given shaft of a turbine engine.

Figure 10:
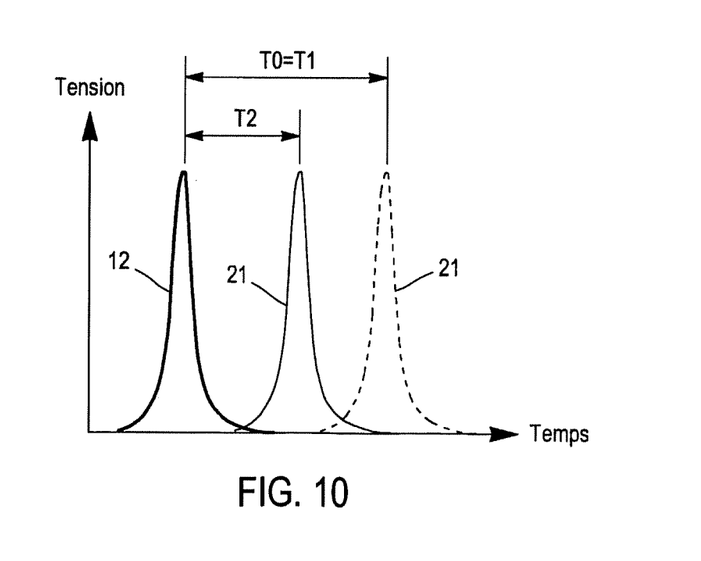
FIG. 10 shows a plurality of stress profiles measured by a torque sensor during the passage of a reference tooth (thick line), a measurement tooth for a turbine shaft without torque (discontinuous line), and a measurement tooth for a turbine shaft with torque (thin line)

A comparative example is shown in FIG. 10, which shows several stress profiles measured by a torque sensor 81 during the passage of a reference tooth (heavy line), a measurement tooth for a turbine shaft 2 without torque (discontinuous line), and a measurement tooth for a turbine shaft 2 with torque (thin line).

For a turbine shaft 2 without torque, the angular spacing T1 between a reference tooth 12 and a measurement tooth 21 is identical to the angular spacing T0 defined in the initial state when the shaft 2 is stationary. Conversely, for a turbine shaft 2 with torque, the angular spacing T2 between the reference tooth 12 and the measurement tooth 21 is different from the angular spacing T0 defined in the initial state when the shaft 2 is stationary. For this reason, it can be seen in FIG. 10 that the stress profile of the measurement tooth 21 is closer to the stress profile of the reference tooth 12, which represents a movement towards one another of the teeth 12, 21 during rotation of the shaft, in other words, a torque. The disruption of the stress profile enables a time difference between the passage of two teeth to be obtained. Thereafter, knowledge of the speed of rotation of the turbine shaft 2 by virtue of the speed sensors 71 makes it possible to deduce the angular spacing sought.

The turbine engine according to the invention enables overspeed and overtorque of the turbine shaft 2 to be monitored while retaining restricted dimensions and a restricted weight. The reference part 10 advantageously plays a part in the measurement of speed and torque, which enables the weight of the turbine engine 1 to be restricted. In addition, the transverse planes of measurement P1, P2 are close to one another, which enables all the detection means 7, 8 to be confined to a single place, which restricts the dimensions of the turbine engine 1.

Second Embodiment

A second embodiment of the invention is described with reference to FIG. 11. The same reference numerals are used to describe elements whose structure or function is identical, equivalent or similar to those of the elements in FIG. 2, to simplify the description. Additionally, the whole description of the embodiment shown in FIG. 2 is not repeated, this description being applicable to the elements in FIG. 11 where there are no incompatibilities. Only significant structural and functional differences are described.

Figure 11:
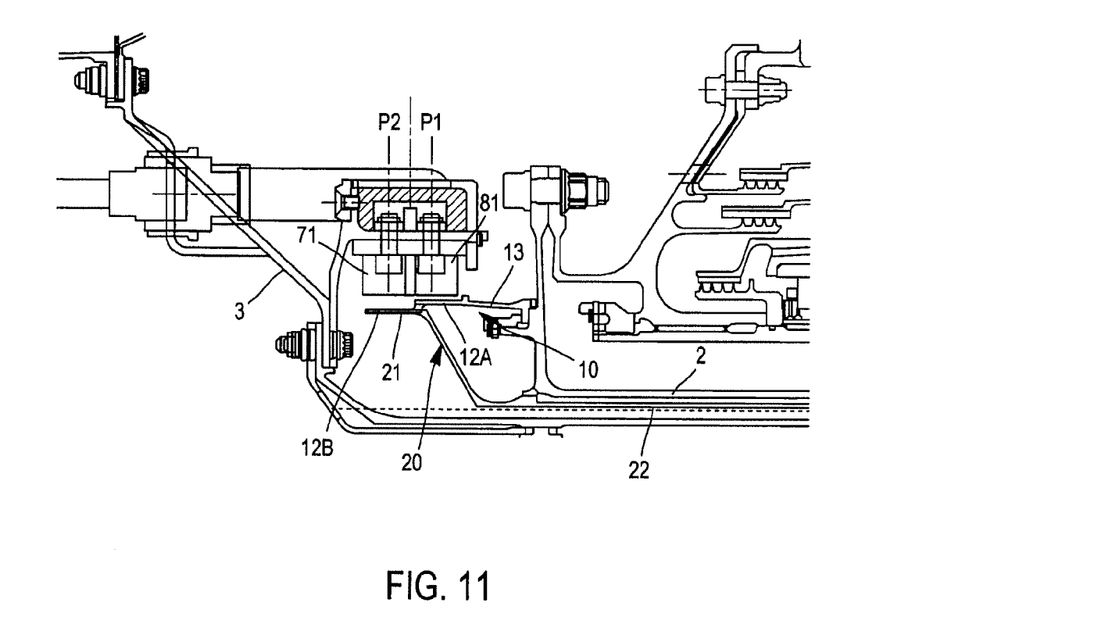
FIG. 11 is a schematic representation in axial cross-section of a second embodiment of a turbine engine according to the invention with a reference part and a measurement part which are both rigidly connected to a shaft of the turbine engine.

In the second embodiment shown in FIG. 11, the cylindrical body 22 of the measurement part 20 is radially inside the cylindrical body 13 of the reference part 10, the measurement teeth 21 and the reference teeth 12 extending from downstream to upstream. In this example, the measurement part 20 is joined upstream of the reference part 10 as shown in FIG. 11.

Third Embodiment

Figures 12, 13, 14:
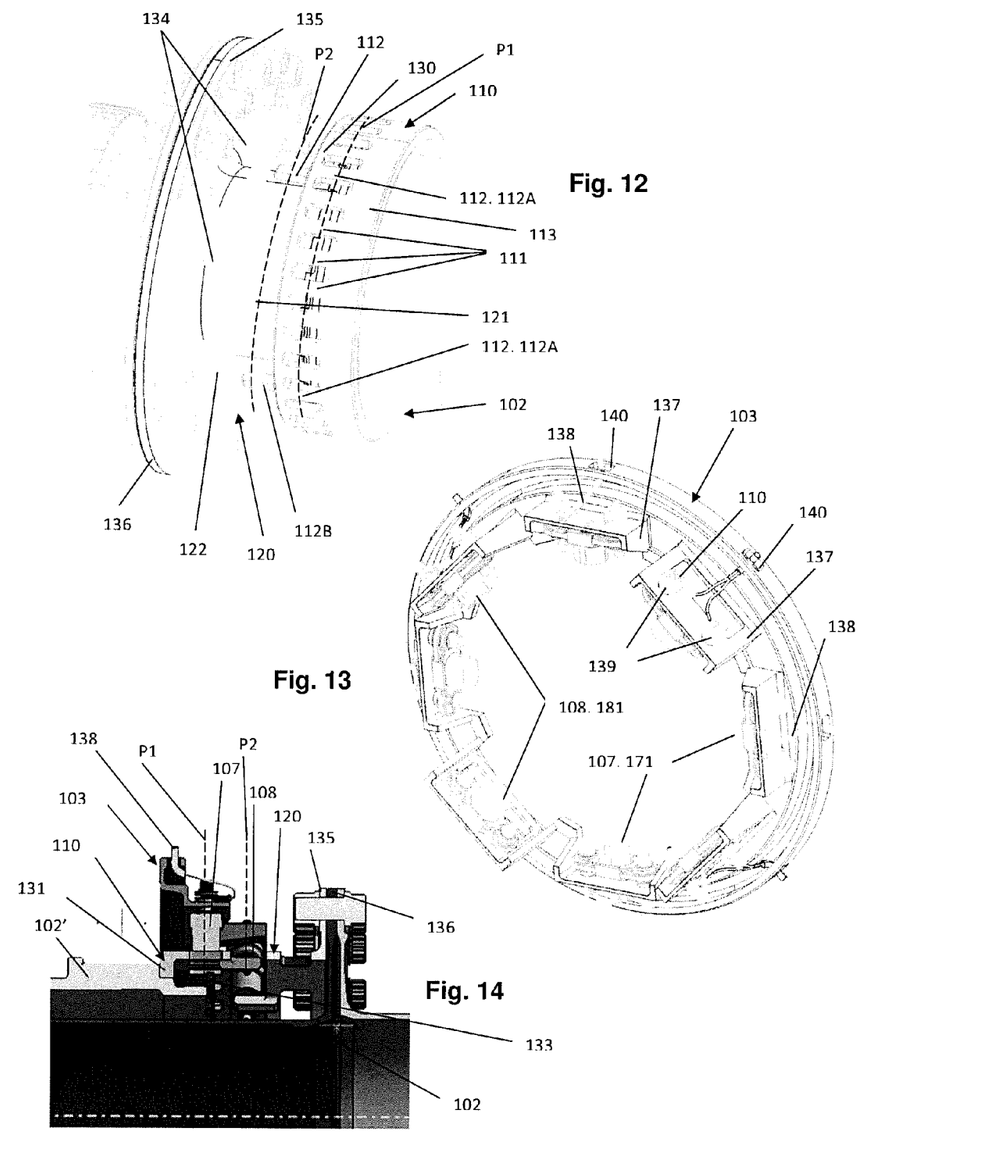
FIG. 12 is a view similar to that of FIG. 3 and showing a third embodiment of the invention.
FIG. 13 is a view similar to that of FIG. 8 for the third embodiment of the invention shown in FIG. 12.
FIG. 14 is a view similar to that of FIG. 2 for the third embodiment of the invention shown in FIG. 12.

FIGS. 12 to 14 represent a variant embodiment of the invention that differs from the first embodiment described above, particularly in the shape of the teeth 111, 112, 121 of the reference part 110 and of the measurement part 120.

The reference part 110 differs from the reference part 10 of the first embodiment described with reference to FIG. 4 essentially in that its short longitudinal reference teeth 111 are separated from one another by slots or perforations (and not notches). The short reference teeth 111 have their upstream or proximal ends connected to the cylindrical body 113 of the part and their downstream or distal ends connected to a downstream ring 130 of the part. This enables the reference part 110 to be stiffened and deflection of the long reference teeth 112 under centrifugal force to be limited.

The long longitudinal reference teeth 112 have a proximal portion 112A terminated by a distal portion 112B. The proximal portion 112A of each long reference tooth 112 extends at the same radial distance from the axis of the turbine engine as the short reference teeth 111, between the cylindrical body 113 and the ring 130. The short reference teeth 111 and the proximal portion 112A of the long reference teeth 112 thus extend in a single plane P1 transverse to the axis of the turbine engine. This first transverse plane P1 forms the speed measurement plane.

The distal portion 112B of each long reference tooth 112 extends upstream from the ring 130 and is radially offset inwards relative to its proximal portion 112A. The distal portions 112B of the long reference teeth 112 extend in a single plane P2 transverse to the axis of the turbine engine. This second transverse plane P2 forms the torque measurement plane.

The reference part 110 is mounted so as to be rigidly connected to the turbine shaft 102, externally thereto. In the example shown in FIG. 14, the upstream end of the reference part 110 has an inner radial shoulder 131 which is held axially against a downstream radial face of an intermediate shaft 102' (connected in rotation to the turbine shaft 102) using a nut 133 screwed onto a downstream end of this intermediate shaft 102'. The upstream end of the reference part 110 comprises anti-rotation means cooperating, with a positive fit, with complementary means of the intermediate shaft 102' in order to prevent the reference part 110 from rotating about the longitudinal axis of the turbine engine.

The reference part 120 differs from the reference part 20 of the first embodiment described with reference to FIG. 6 essentially in that its cylindrical body 122 is perforated and comprises an annular row of perforations or slots 134, which enables, in particular, to lighten the part 120. The reference part 110 and the measurement part 120 thus comprise perforations and so have similar geometries, which makes it possible to obtain symmetry in the induction interference effects (Eddy currents in the parts), to facilitate signal processing, and to increase the accuracy of the measurements.

The measurement teeth 121 all extend at the same radial distance from the axis of the turbine engine, and in particular at the same radial distance as the distal portion 112B of the long reference teeth 112. In addition, the measurement teeth 121 extend in the transverse plane P2.

The measurement part 120 is mounted so as to be rigidly connected to the turbine shaft 102, externally thereto. In the example shown in FIG. 14, the downstream end of the measurement part 120 comprises an annular flange 135 for fixing by bolts to an annular flange 136 of the shaft 102.

The detection means 107, 108 are similar to the detection means 7, 8 described above. They are rigidly connected to the casing 103 of the turbine engine as shown in FIG. 14. They take the form here of inductive sensors 171, 181 extending in two separate transverse planes P1, P2. The inductive sensors of the first and second detection means 107, 108 are mounted integrally to plates 137 which are rigidly connected to an annular support mounted on the casing 103. The sensors 171, 181 are oriented radially towards the axis of the turbine engine so as to detect the passage of the teeth 111, 112, 121.

The inductive or speed sensors 171 of the first detection means 107 are distributed at the circumference of the casing 103 in the first plane P1 and at the same radial distance from the axis of the turbine engine. The inductive or torque sensors 181 of the second detection means 108 are distributed at the circumference of the casing 103 in the second plane P2 and at a radial distance from the axis of the turbine engine that is less than that of the sensors 171. The speed sensors 171 and the torque sensors 181 are alternate, in other words, staggered, so as to limit the risk of interference between sensors 171, 181 that do not belong to a single plane P1, P2, and to reduce the dimensions.

The sensors 171, 181 are connected to a calculator (not shown) of the turbine engine by electrical cables 138. Each sensor is here fixed to its support plate 137 by two screws which connect the sensor electrically to two cables 138 respectively. Each cable 138 is connected at one end to a terminal 139 through which the screw passes, the cables 138 that supply power to each sensor forming an electrical harness that passes through a radial orifice 140 of the annular support and which is connected to the calculator.

The invention claimed is:

1. Turbine engine, in particular for an aircraft, comprising at least one axial shaft rotatably mounted in a casing of the turbine engine, the turbine engine comprising:
    an annular reference part which is rigidly connected to a first portion of the shaft of the turbine engine, the reference part comprising short and long longitudinal reference teeth;
    first means for detecting the passage of the short and long reference teeth in a first transverse plane so as to measure the speed of the shaft of the turbine engine about its axis;
    an annular measurement part which is rigidly connected to a second portion (A2) of the shaft of the turbine engine which is remote from said first portion, the measurement part comprising longitudinal measurement teeth; and
    second means for detecting the passage of the long reference teeth and the measurement teeth in a second transverse plane so as to measure the torque of the shaft of the turbine engine.

2. Turbine engine according to claim 1, wherein the short reference teeth and the measurement teeth are at different radial distances from the axis of the turbine engine.

3. Turbine engine according to claim 2, wherein each long reference tooth has a proximal portion and a distal portion that are at different radial distances from the axis of the turbine engine.

4. Turbine engine according to claim 1, wherein each long reference tooth has a proximal portion and a distal portion that are at different radial distances from the axis of the turbine engine.

5. Turbine engine according to claim 4, wherein the proximal portion of each long reference tooth extends at the same radial distance as the short reference teeth.

6. Turbine engine according to claim 5, wherein the proximal portion of a long reference tooth is radially external to its distal portion.

7. Turbine engine according to claim 5, wherein the short reference teeth and the proximal portions of the long reference teeth are formed by a perforated annular portion of the annular reference part.

8. Turbine engine according to claim 4, wherein the proximal portion of a long reference tooth is radially external to its distal portion.

9. Turbine engine according to claim 8, wherein the short reference teeth and the proximal portions of the long reference teeth are formed by a perforated annular portion of the annular reference part.

10. Turbine engine according to claim 4, wherein the short reference teeth and the proximal portions of the long reference teeth are formed by a perforated annular portion of the annular reference part.

11. Turbine engine according to claim 10, wherein the distal portions of the long reference teeth extend longitudinally from said perforated annular portion.

12. Turbine engine according to claim 11, wherein the distal portion of each long reference tooth is axially aligned with or angularly offset from the proximal portion of said tooth.

13. Turbine engine according to claim 10, wherein the distal portion of each long reference tooth is axially aligned with or angularly offset from the proximal portion of said tooth.

14. Turbine engine according to claim 1, wherein the turbine engine has the same number of long reference teeth and measurement teeth.

15. Turbine engine according to claim 1, wherein the first detection means and the second detection means are at different radial distances from the axis of the turbine engine.

16. Turbine engine according to claim 1, wherein the first detection means and the second detection means take the form of inductive speed sensors and inductive torque sensors respectively, the speed sensors and the torque sensors being identical.

17. Turbine engine according to claim 16, wherein the speed sensors and the torque sensors are rigidly connected to the casing of the turbine engine and alternate at the circumference of the casing.

18. Method for monitoring an axial shaft of a turbine engine which is mounted rotatably in a casing of the turbine engine, the turbine engine comprising an annular reference part rigidly connected to a first portion of the shaft of the turbine engine, the reference part comprising short and long longitudinal reference teeth, an annular measurement part which is rigidly connected to a second portion of the shaft of the turbine engine which is remote from said first portion, the measurement part comprising longitudinal measurement teeth, the method comprising:
    a step of detecting the passage of the short and long reference teeth in a first transverse plane so as to measure the speed of the shaft of the turbine engine about its axis; and
    a step of detecting the passage of the long reference teeth and the measurement teeth in a second transverse plane so as to measure the torque of the shaft of the turbine engine.

* * * * *